United States Patent Office 2,918,476
Patented Dec. 22, 1959

2,918,476

THIOPROPYLENE SULPHIDE DERIVATIVES

Alan Queen, Headley Heath, England, assignor to Beecham Research Laboratories Limited, Surrey, England, a British company No Drawing. Application May 2, 1957
Serial No. 656,506

Claims priority, application Great Britain May 2, 1956

9 Claims. (Cl. 260—327)

This invention relates to thiopropylene sulphide derivatives.

Thiopropylene sulphide is a compound having the formula:

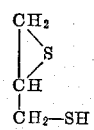

It is a compound which has previously been of little practical use though it is referred to in United Kingdom patent specification No. 597,368 for use in the production of polymers of acrylonitrile.

It has now been found according to this invention that certain S-esters of thiopropylene sulphide possess considerable anti-tubercular activity as measured by laboratory tests on animals, the activity of a number of the S-esters being similar to that of streptomycin tested under the same conditions.

The present invention provides new S-esters of thiopropylene sulphide of the general formula:

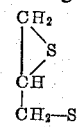

where R is an alkyl group having from 2 to 12 carbon atoms inclusive, a substituted alkyl group, a substituted or unsubstituted aryl, aralkyl, alkoxy, cycloalkyl or heterocyclic group.

The compounds of this invention which are of particular interest because of their anti-tubercular activity are those having the general Formula I where R is a chloro-substituted alkyl group, for example a mono- or di-chloro-methyl group; an alkoxy group, for example a methoxy or ethoxy group; a phenyl or substituted phenyl group, for example a p-chloro- or p-nitro- phenyl group; or a furyl group. A large number of other S-esters of thiopropylene sulphide having anti-tubercular activity are described in the examples of this specification.

Hitherto, the only S-ester of thiopropylene sulphide which has been disclosed is 3-acetyl-thiopropylene sulphide whose preparation was described by Miles and Owen (J., 1952, 817), but no reference was made by Miles and Owen to the anti-tubercular activity of this compound.

The process described by Miles and Owen is one in which 2:3-diacetylthiopropanol or its corresponding acetate is treated with sodium bicarbonate and the product, 3-acetylthiopropylene sulphide isolated by steam distillation under reduced pressure.

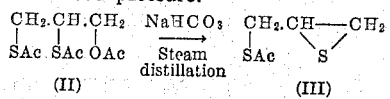

where Ac is an acetyl group.

However, this process has a number of disadvantages of which the most serious are:

(1) Although this method works well with the compound (II) (yield 80%) we have found that the analogous 2:3-dipropionylthiopropyl propionate reacts much less readily (yield 40%) and 2:3-dibutyrylthiopropyl butyrate hardly at all (yield 1%).

(2) The steam distillation technique is tedious on a larger scale.

(3) The method is limited by the availability of the diacylthiopropyl esters.

We have now devised a new general process for the preparation of S-esters of thiopropylene sulphide which is free from the disadvantages referred to above.

The present invention, therefore, provides a process for the preparation of compounds of the general Formula I, in which 3-mercaptopropylene sulphide is reacted with a halogen compound of the general formula R.CO.X where R is a substituted, e.g. halo-substituted, or unsubstituted alkyl, aryl, aralkyl, alkoxy, cycloalkyl or heterocyclic group, e.g. a furyl group and X is a halogen; followed by treatment of the resulting product with an inorganic base.

The halogen compound of the general formula R.CO.X can be either a carboxylic acid halide or, in the instances where R is an alkoxy group, an alkyl ester of a halo-carbonic acid. Where a carboxylic acid halide is used as the halogen compound, it is in general preferable to use an acid chloride as acid chlorides are in many instances available commercially and in any event are readily obtainable in the laboratory. Similarly, where the halogen compound used is an ester of a halo-carbonic acid it is usually convenient to use an ester of a chloro-carbonic acid though esters of other halo-carbonic acids can be used if desired.

The process of the invention is thought to take place in the following way:

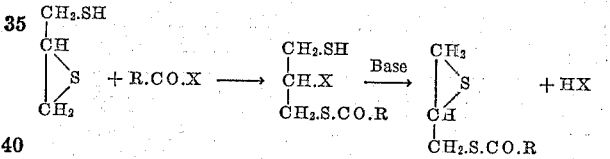

The first stage of the reaction may be carried out in the absence of a solvent, but it is often more convenient to employ an inert diluent such as diethyl ether which may, but need not, be removed by distillation before proceeding to the second stage. The reaction temperature for the first stage may be varied depending upon the reactivity of the particular halogen compound, but in general we prefer to employ a temperature from 0° C. to 80° C. where no solvent or diluent is employed and from 0° C. to the boiling point of the solvent or diluent where one is employed. The intermediate compounds formed cannot normally be isolated in a pure state as they undergo decomposition when an attempt is made to distill them, but the crude material can readily be converted into the desired product by shaking or stirring it at room temperature with an inorganic base, such as an aqueous solution of sodium bicarbonate. A weak base is preferred for the second stage of the reaction owing to the tendency for the resulting substituted propylene sulphide to polymerise in the presence of strong bases, such as sodium hydroxide, with consequent reduction in yield. The product is conveniently isolated by extraction with a suitable solvent, followed by distillation or by recrystallisation depending on the nature of the product.

The starting material, 3-mercaptopropylene sulphide, is readily available by the reaction of 2:3-dimercaptopropanol with concentrated hydrochloric acid to give the corresponding chloride which is then treated with a weak base to give the sulphide (cf. United Kingdom patent specification No. 508,932 and U.S.A. specification No. 2,183,860).

It may also be prepared by the thermal dehydration of 2:3-dimercaptopropanol (cf. United Kingdom patent specification No. 597,368 and U.S.A. specifications Nos. 2,396,957 and 2,436,233) or by the reaction of 2:3-dimercaptopropanol acetate with alkali (Miles and Owen, loc. cit.).

The following examples illustrate the invention:

(1) 3-CHLOROACETYLTHIOPROPYLENE SULPHIDE (I; R=CH$_2$Cl)

Chloroacetyl chloride (11.3 g., 0.1 g.-mol) was added dropwise to a stirred solution of 3-mercaptopropylene sulphide (10.6 g., 0.1 g.-mol) in dry ether (50 ml.) at 0 to 4° C. The colourless solution was allowed to stand at room temperature for two days and then stirred for 18 hours, with sodium bicarbonate (15 g.) in water (110 ml.). The oil was then extracted and the extracts washed, dried, and concentrated to leave a colourless oil which was distilled under reduced pressure. The fraction, B.P. 88–90° C./0.2 mm. was collected and redistilled to give 3-chloroacetylthiopropylene sulphide, B.P. 88° C./0.2 mm. $n_D^{19}$ 1.5840 (8.9 g., 49%). (Found: C, 33.2; H, 3.6; S, 34.9. C$_5$H$_7$S$_2$OCl requires C, 32.9; H, 3.9; S, 35.1%.)

(2) 3-ETHOXYCARBONYLTHIOPROPYLENE (I; R=OEt)

Ethyl chloroformate (9.5 g., 0.1 g.-mol) was added dropwise to a stirred solution of 3-mercaptopropylene sulphide (10.6 g., 0.1 g.-mol) in dry ether (50 ml.) at room temperature. After 24 hours at room temperature the solution was refluxed for one hour and then stirred for 16 hours with sodium bicarbonate (10 g.) in water (110 ml.). The product was extracted with ether and the extracts were washed, dried and concentrated. The residue was distilled to give 3-(ethoxycarbonyl)thiopropylene sulphide (8 g., 50%), B.P. 60° C./0.01 mm., $n_D^{20.5}$ 1.5298. (Found: C, 40.2; H, 5.6; S, 36.0. C$_6$H$_{10}$S$_2$O$_2$ requires C, 40.4; H, 5.6; S, 35.9%.)

(3) 3-(ETHOXYCARBONYL)ACETYLTHIOPROPYLENE SULPHIDE (I; R=CH$_2$COOEt)

Melonic acid ethyl ester chloride (15.1 g., 0.1 g.-mol) in ether (10 ml.) was added dropwise with stirring to a solution of 3-mercaptopropylene sulphide (10.6 g., 0.1 g.-mol) in ether (40 ml.) at 0 to 4° C. The mixture was left at room temperature for 18 hours, refluxed for half an hour, and then stirred for 18 hours with sodium bicarbonate (10 g.) in water (110 ml.). The product was extracted into ether, and the extracts were washed, dried and concentrated. The residue was distilled and the fraction B.P. 98–108° C./0.2 mm. collected, which, after three distillations, yielded 3-(ethoxycarbonyl)acetylthiopropylene sulphide (9.8 g., 45%), B.P. 110–111° C./0.15 mm., $n_D^{19}$ 1.5290, as a colourless liquid. (Found: C, 43.8; H, 5.5; S, 28.0. C$_8$H$_{12}$S$_2$O$_3$ requires C, 43.6; H, 5.4; S, 29.0%.)

(4) 3-BENZOYLTHIOPROPYLENE SULPHIDE (I; R=Ph)

Freshly distilled benzoyl chloride (13.9 g., 0.1 g.-mol.) was added dropwise over 20 minutes to a gently refluxing solution of 3-mercaptopropylene sulphide (10.6 g., 0.1 g.-mol) in dry ether (50 ml.) and the mixture then refluxed for a further 90 minutes. After 16 hours at room temperature the ethereal solution was stirred for 18 hours with sodium bicarbonate (10 g.) in water (110 ml.), and the product extracted into ether. The extracts were washed, dried and concentrated to give a colourless oil which was distilled, the fraction B.P. 116° C./0.05 mm. being collected. This was purified by two further distillations to give 3-benzoylthiopropylene sulphide as a colourless liquid (4.7 g., 22%), B.P. 130° C./0.01 mm., $n_D^{18}$ 1.625. (Found: C, 56.7; H, 4.7; S, 29.6. C$_{10}$H$_{10}$S$_2$O requires C, 57.1; H, 4.8; S, 30.5%.)

(5) 3-p-CHLOROBENZOYLTHIOPROPYLENE SULPHIDE

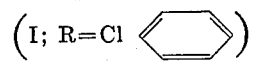

p-Chlorobenzoyl chloride (17.5 g., 0.1 mol) was added dropwise to a solution of 3-mercaptopropylene sulphide (10.6 g., 0.1 g.-mol) in dry ether (50 ml.) and the mixture refluxed for 4 hours. The ethereal solution was stirred with sodium bicarbonate (10 g.) in water (100 ml.) for 3.5 hours and the ethereal layer then separated. The aqueous layer was extracted with ether and the combined ether solutions were washed with water and dried over magnesium sulphate. After filtration of the drying agent and removal of the solvent, a solid was obtained, M.P. 70–72° C., which on crystallisation from aqueous ethanol (80%) yielded 3-p-chlorobenzoylthiopropylene sulphide as colourless needles, M.P. 74° C. (24.2 g.; 99%). (Found: S, 26.4; Cl, 14.1. C$_{10}$H$_9$S$_2$ClO requires S, 26.2; Cl, 14.5%.)

(6) 3-PROPIONYLTHIOPROPYLENE SULPHIDE (I=Et)

Propionyl bromide (13.7 g.) was gradually added to a solution of 3-mercaptopropylene sulphide (10.6 g.) in dry ether (50 cc.) while keeping the temperature of the reaction mixture at 0° C. The mixture was left at room temperature overnight and was then heated under reflux for about 30 minutes. After cooling to room temperature, a solution of sodium bicarbonate (10 g.) in water (about 100 ml.) was gradually added and the mixture was stirred for 4 hours. The organic layer was then separated, washed with a little water and dried (MgSO$_4$). After removing the solvent the residue was distilled. Yield 24%, B.P. 94–96° C./0.2 mm.; $n_D^{24}$ 1.5450. (Found: C, 43.6; H, 6.3; S, 38.9. C$_6$H$_{10}$S$_2$O requires C, 44.4; H, 6.2; S, 39.5%.)

Further acylthiopropylene sulphides prepared as in the above examples are shown in the table below:

Table 1

| Ex. No. | | Boiling point | Percent Yield | Refractive Index | |
|---|---|---|---|---|---|
| 7 | 3-Butyrylthiopropylene-sulphide. | 61–65° C./0.15 mm | 35.0 | $n_D^{27}$ 1.5337 | C$_7$H$_{12}$S$_2$O—Req.: C, 47.1; H, 6.6; S, 36.8. Found: C, 47.4; H, 6.9; S, 36.4%. |
| 8 | 3-Dichloroacetylthio-propylene sulphide. | 86° C./0.1 mm | 29.0 | $n_D^{18}$ 1.5850 | C$_5$H$_6$S$_2$OCl$_2$—Req.: C, 27.6; H, 2.7; S, 29.5; Cl, 32.7. Found: C, 28.0; H, 3.0; S, 29.2; Cl, 32.3%. |
| 9 | 3-β-Chloropropionylthio-propylene sulphide. | 98° C./0.2 mm | 41.0 | $n_D^{20}$ 1.5645 | C$_6$H$_9$S$_2$OCl—Req.: C, 36.6; H, 4.6; S, 32.6; Cl, 18.1. Found: C, 36.4; H, 4.5; S, 32.2; Cl, 17.6%. |
| 10 | 3-Phenylacetylthio-propylene sulphide. | 137–8° C./0.3 mm | 38.0 | $n_D^{19}$ 1.5985 | C$_{11}$H$_{12}$S$_2$O—Req.: C, 58.9; H, 5.35; S, 28.6. Found: C, 58.4; H, 5.45; S, 28.1%. |
| 11 | 3-Ethoxalythio-propylene sulphide. | 116–8° C./0.3 mm | 24.0 | $n_D^{23}$ 1.5395 | C$_7$H$_{10}$S$_2$O$_3$—Req.: C, 41.7; H, 4.6; S, 31.1. Found: C, 41.1; H, 4.9; S, 31.1%. |
| 12 | 3-β-(Methoxycarbonyl) propionylthio-propylene sulphide. | 120–4° C./0.1 mm | 39.0 | $n_D^{18}$ 1.539 | C$_8$H$_{12}$S$_2$O$_3$—Req.: C, 43.6; H, 5.5; S, 29.1. Found: C, 43.6; H, 5.7; S, 28.8%. |
| 13 | 3-p-Nitrobenzoylthio-propylene sulphide. | M.P. 62–63° C | 59.0 | | C$_{10}$H$_9$S$_2$NO$_3$—Req.: C, 47.1; H, 3.5; S, 25.1; N, 5.5. Found: C, 46.7; H, 3.7; S, 25.7; N, 5.5%. |
| 14 | 3-Furoylthiopropylene sulphide. | B.P. 120° C./0.1 mm | 56.0 | $n_D^{20}$ 1.618 | C$_8$H$_8$S$_2$O$_2$—Req.: C, 48.0; H, 4.0; Found: C, 47.6; H, 4.2%. |

Table II

| Ex. No. | | B. P. or M. P. | Percent Yield | Refractive Index or solvent for recrystallisation | |
|---|---|---|---|---|---|
| 15 | 3 - Hexahydrobenzoylthio - propylene sulphide. | B.P. 89° C./0.05 mm | 53 | $n_D^{23}$ 1.5464 | Req.: C,55.8; H,7.0. Found: C,56.1; H,7.4%. |
| 16 | 3 - Trichloroacetylthiopropylene sulphide. | B.P. 111° C./0.4 mm | 40 | $n_D^{22}$ 1.5822 | Req.: C,23.9; H,2.0; S,25.4; Cl,42.4%. Found: C,23.9; H,2.2; S,25.1; Cl,42.5%. |
| 17 | 3 - Ethylthioacetylthiopropylene sulphide. | B.P. 112° C./0.025 mm | 9 | $n_D^{25}$ 1.5790 | Req.: C,40.8; H,5.8; S,46.2. Found: C,40.0; H,5.7; S,46.0%. |
| 18 | 3-β-Methylthiopropionylthiopropylene sulphide. | B.P. 122° C./0.01 mm | 5 | $n_D^{22}$ 1.5781 | Req: C,40.4; H,5.8; S,46.2. Found: C,40.5; H,6.0; S,46.5%. |
| 19 | 3 - α - Chlorophenylacetyl - thiopropylene sulphide. | M.P. 69-71° C | 2 | Petrol (40-60) | Req.: C,51.0; H,4.3; S,24.8; Cl,13.7. Found: C,50.4; H,4.9; S,25.3; Cl,14.0%. |
| 20 | 3 - p - Chlorophenylacetyl - thiopropylene sulphide. | M.P. 32-34° C | 77 | Methanol | Req: C,51.0; H,4.3; S,24.8. Found: C,51.1; H,4.9; S,24.7%. |
| 21 | 3 - p - Chlorophenoxyacetyl - thiopropylene sulphide. | M.P. 42-42.5° C | 34 | Ether—pet. ether (80-100) mixture. | Req.: C,48.1; H,4.0; S,23.3; Cl,12.9. Found: C,48.4; H,4.5; S,23.1 Cl,12.0%. |
| 22 | 3 - Hippurylthiopropylene sulphide. | M.P. 120° C | 21 | aqueous ethanol (80%) | Req.: C,53.9; H,4.9; N,5.2; S,23.8. Found: C,54.0; H,5.1; N,5.3; S,24.0%. |
| 23 | 3 - Phthalimidoacetylthiopropylene sulphide. | M.P. 102° C | 74 | ethanol (95%) | Req.: C,53.2; H,3.8; N,4.8; S,21.8. Found: C,53.5; H,4.4; N,5.0; S,21.9%. |
| 24 | 3-p-Dimethylamin-benzoylthiopropylene sulphide. | M.P. 78-81° C | 13 | petrol (60-80) | Req.: C,56.9; H,5.9; N,5.5; S,25.3. Found: C,56.9; H,6.2; N,6.0; S,23.9%. |
| 25 | 3-p-Phenylazobenzoylthiopropylene sulphide. | M.P. 81-82° C | 83 | petrol (60-80) | Req.: C,61.1; H,4.5; N,8.9; S,20.4. Found: C,61.5; H,4.2; N,9.2; S,19.5%. |
| 26 | 3-Methoxycarbonylthiopropylene sulphide. | B.P. 65° C./0.25 mm | 67 | $n_D^{18}$ 1.5440 | Req.: C,36.6; H,4.9; S,39.0. Found: C,36.7; H,5.0; S,39.4%. |
| 27 | 3-n-Butoxycarbonylthiopropylene sulphide. | B.P. 103° C./0.01 mm | 19 | $n_D^{16}$ 1.5180 | Req.: C,46.6; H,6.8; S,31.1. Found: C,45.8; H,6.7; S,30.4%. |
| 28 | 3 - Benzyloxycarbonylthiopropylene sulphide. | B.P. 140° C./0.05 mm | | $n_D^{17}$ 1.5840 | Req.: C,55.0; H,5.0; S,26.7. Found: C,54.9; H,5.1; S,26.8%. |

What I claim is:

1. Compounds of the general formula:

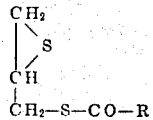

where R is the phenyl group.

2. Compounds of the general formula:

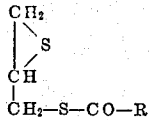

where R is the p-chloro phenyl group.

3. Compounds of the general formula:

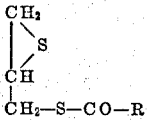

where R is the p-nitro phenyl group.

4. Compounds of the general formula:

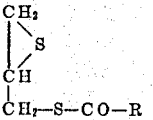

where R is a chloro alkyl group having from 1 to 12 carbon atoms in the alkyl group.

5. Compounds of the general formula:

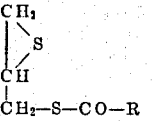

where R is an alkoxy group having from 1 to 4 carbon atoms.

6. Compounds of the general formula:

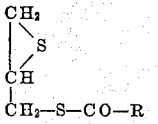

where R is the furyl group.

7. A process for the preparation of compounds of the general formula:

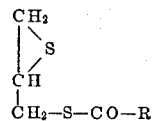

where R is selected from the group consisting of alkyl groups of 2 to 12 carbon atoms, chloro alkyl groups having from 1 to 12 carbon atoms in the alkyl group, alkoxy groups having from 1 to 4 carbon atoms, the phenyl group, the p-chloro phenyl group, the p-nitro phenyl group, the group $(CH_2)_n$—$COOR_1$, wherein $R_1$ is one of the groups methyl and ethyl and $n$ is one of the integers 1 and 2, the group $(CH_2)_n SR_1$, wherein $R_1$ and $n$ have the meanings just hereinbefore given, the cyclohexyl group, the furyl group, the benzyloxy group and the chloro benzyl group, which comprises reacting 3-mercapto-propylene sulphide with a compound of the general formula R.CO.X where X is a halogen atom and R has the meaning stated above, and treating the resulting product with a weak inorganic base substantially free of any tendency to cause polymerization of said product.

8. A process for the preparation of compounds of the general formula:

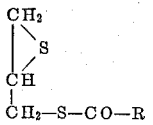

where R is selected from the group consisting of alkyl groups of 2 to 12 carbon atoms, chloro alkyl groups having from 1 to 12 carbon atoms in the alkyl group, alkoxy groups having from 1 to 4 carbon atoms, the phenyl group, the p-chloro phenyl group, the p-nitro phenyl group, the group $(CH_2)_n$—$COOR_1$, wherein $R_1$ is one of the groups methyl and ethyl and $n$ is one of the integers 1 and 2, the group $(CH_2)_n SR_1$, wherein $R_1$ and $n$ have the meanings just hereinbefore given, the cyclohexyl group, the furyl group, the benzyloxy group and the chloro benzyl group, which comprises reacting 3-mercapto-propylene sulphide with an acid chloride of the general formula R.CO.Cl where R has the meaning stated above, and treating the resulting product with a weak inorganic base substantially free of any tendency to cause polymerization of said product.

9. A process for the preparation of compounds of the general formula:

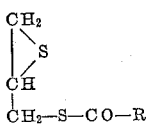

where R is selected from the group consisting of alkyl groups of 2 to 12 carbon atoms, chloro alkyl groups having from 1 to 12 carbon atoms in the alkyl group, alkoxy groups having from 1 to 4 carbon atoms, the phenyl group, the p-chloro phenyl group, the p-nitro phenyl group, the group $(CH_2)_n$—$COOR_1$, wherein $R_1$ is one of the groups methyl and ethyl and $n$ is one of the integers 1 and 2, the group $(CH_2)_nSR_1$, wherein $R_1$ and $n$ have the meanings just hereinbefore given, the cyclohexyl group, the furyl group, the benzyloxy group and the chloro benzyl group, which comprises reacting 3-mercapto-propylene sulphide with a compound of the general formula R.CO.X where X is a halogen and R has the meaning stated above in the presence of a solvent at a temperature between 0° C. and the boiling point of the solvent, and treating the resulting product with a weak inorganic base substantially free of any tendency to cause polymerization of said product.

References Cited in the file of this patent

Miles et al.: Journal of the Chemical Society, 1952, pp. 817–26.

Harding: Chemistry and Industry (London), 1951, p. 887.

Wertheim: Textbook of Organic Chemistry, the Blakiston Co., N.Y., 3rd edition, 1952.